United States Patent
Lu et al.

(10) Patent No.: US 12,347,098 B1
(45) Date of Patent: Jul. 1, 2025

(54) METHOD FOR DETERMINING NUMBER OF PRODUCT QUALITY INCIDENTS BASED ON CONVOLUTIONAL NEURAL NETWORK

(71) Applicant: China National Institute of Standardization, Beijing (CN)

(72) Inventors: Yuwei Lu, Beijing (CN); Yunjie Zhi, Beijing (CN); Jingna Yang, Beijing (CN)

(73) Assignee: China National Institute of Standardization, Beijing (CN)

( * ) Notice: Subject to any disclaimer, the term of this patent is extended or adjusted under 35 U.S.C. 154(b) by 0 days.

(21) Appl. No.: 19/096,601

(22) Filed: Mar. 31, 2025

(30) Foreign Application Priority Data

Apr. 11, 2024 (CN) .......................... 202410436053.1

(51) Int. Cl.
*G06T 7/00* (2017.01)
(52) U.S. Cl.
CPC .... *G06T 7/001* (2013.01); *G06T 2207/20081* (2013.01); *G06T 2207/20084* (2013.01); *G06T 2207/30108* (2013.01)
(58) Field of Classification Search
CPC ........... G06T 7/001; G06T 2207/20081; G06T 2207/20084; G06T 2207/30108; G06V 10/82; G06V 10/25; G06V 20/41; G06V 2201/07; G06Q 10/06395; Y02P 90/30
See application file for complete search history.

(56) References Cited

FOREIGN PATENT DOCUMENTS

| CN | 113569737 A | | 10/2021 |
|---|---|---|---|
| CN | 115619732 A | * | 1/2023 |
| CN | 114881329 B | | 4/2023 |
| CN | 116823063 A | * | 9/2023 |
| CN | 117250208 A | | 12/2023 |
| CN | 117557157 A | | 2/2024 |

* cited by examiner

*Primary Examiner* — Samir A Ahmed

(57) ABSTRACT

Disclosed is a method for determining a number of product quality incidents based on a convolutional neural network, the method includes the following steps: building an appearance quality dataset, building a quality evaluation model, and analyzing a number of product quality incidents; a preset model and a preset optimized model are trained and validated according to the built appearance quality dataset to obtain initial quality evaluation models, which are filtered to obtain a quality evaluation model according to model performance coefficient and comprehensive model coefficient, product appearance defect data are obtained according to appearance defect data detected and obtained by the quality evaluation model, appearance defect ratio and significant appearance defect ratio of the products under quality inspection are obtained according to the product appearance defect data, and a number of product quality incidents of the products under quality inspection is finally obtained according to an incident occurrence coefficient.

6 Claims, 1 Drawing Sheet

METHOD FOR DETERMINING NUMBER OF PRODUCT QUALITY INCIDENTS BASED ON CONVOLUTIONAL NEURAL NETWORK

CROSS-REFERENCE TO RELATED APPLICATION

This application claims priority of Chinese Patent Application No. 202410436053.1, filed on Apr. 11, 2024, the entire contents of which are incorporated herein by reference.

TECHNICAL FIELD

The present disclosure relates to the technical field of industrial intelligent production monitoring, and particularly relates to a method for determining a number of product quality incidents based on a convolutional neural network.

BACKGROUND

A convolutional neural network (CNN) is a deep learning model, which generally searches for patterns and regularities in inputted image data through hierarchical feature extraction and convolution operations. It is mainly applied in computer vision, image recognition, object detection, facial recognition, and the like. It is very important to identify and determine a number of product quality incidents. The stability of product quality can be evaluated by tracking changes in the number of product quality incidents. When the number of product quality incidents continues to decline or remains at a low level, it indicates that the product quality is more stable. On the contrary, when the number of product quality incidents increases or fluctuates, further investigation and improvements of a production process need to be conducted to improve the product quality. In addition, the number of product quality incidents can be used to monitor whether products meet relevant standards and requirements. By comparing the number of product quality incidents with product specifications and quality standards, it can be determined whether the products meet an expected quality level. When the number of product quality incidents exceeds specified quality indicators, corrective measures need to be taken to ensure product conformity.

In the prior art, the number of product quality incidents is usually determined through statistical methods and customer feedback. Specifically, the statistical methods involve calculating various indicators and correlations among the indicators by using historical records and relevant data to evaluate the number of product quality incidents, and customer feedback and complaint data can be used to have a clear understanding of problems related to product quality and a specific number of product quality incidents.

For example, the Chinese Patent (Publication No. CN114881329B) discloses a tire quality prediction method and system based on a guided graph convolutional neural network, including building a tire knowledge graph; building an adjacency matrix based on the knowledge graph, and using an embedding vector for neighborhood information representation learning to obtain a neighborhood entity representation vector; introducing an attention mechanism to assess a degree of importance of the neighborhood entity representation vector in the knowledge graph to tire product quality based on the neighborhood entity representation vector, and obtaining a comprehensive tire product representation vector in combination with the guided graph convolutional neural network; calculating an attention score between the comprehensive tire product representation vector and neighborhood information of quality inspection standards to guide the convolution and aggregation of the quality inspection standards; and predicting the tire product quality for samples under inspection based on the comprehensive tire product representation vector of the quality inspection standards to obtain tire quality prediction results.

For example, the Chinese Patent (Publication No.: CN117557157A) discloses a quality assessment and evaluation method based on a convolutional neural network, including determining a reference product, first use environment information of the reference product, and second use environment information of the reference product; taking information of the reference product as first samples when the first use environment information and the second use environment information both indicate positive feedback; taking information of the reference product as second samples when the first use environment information and the second use environment information both indicate negative feedback; filtering the first samples by using the information of the reference product (excluding the first samples and the second samples); constructing positive samples based on the filtered first samples and corresponding first use environment information and second use environment information of the filtered first samples; constructing negative samples based on the second samples and corresponding first use environment information and second use environment information of the second samples; training the convolutional neural network using the positive samples and the negative samples to obtain a target model; determining a target feature graph; and using the target model to predict quality assessment and evaluation results of the target product using the target model based on the target feature graph.

However, during the implementation of the technical solutions in the embodiments of the present disclosure, it is identified that the prior art has at least the following technical problems:

In the prior art, it usually takes some time for the statistical methods and customer feedback to make statistics of the corresponding data, and subjective factors are involved in the subsequent analysis process. As a result, a current number of product quality incidents cannot be accurately and promptly reflected, leading to low accuracy in determining the number of product quality incidents.

SUMMARY

The present disclosure aims to provide a method for determining a number of product quality incidents based on a convolutional neural network, so as to solve the problem of low accuracy in determining the number of product quality incidents in the prior art, thereby improving the accuracy of determining the product quality incidents.

An embodiment of the present disclosure provides a method for determining a number of product quality incidents based on a convolutional neural network, including the following steps: obtaining appearance quality data of products under quality inspection to build an appearance quality dataset, where the appearance quality dataset is a collection of preprocessed appearance quality data, the appearance quality data is image data describing quality of the products under quality inspection, and the quality of the products under quality inspection is related to corresponding product appearance defects; training and validating a preset model using the built appearance quality dataset to obtain a quality evaluation model, where the quality evaluation model is used to obtain the product appearance defects of the products under quality inspection, and the preset model is an anchor-based model in the convolutional neural network and has an object detection function; obtaining product appearance defect data through appearance quality videos of the products under quality inspection detected and photographed by the quality evaluation model, and obtaining the number of product quality incidents of the products under quality inspection by analyzing the product appearance defect data in combination with a product appearance defect threshold, where the appearance quality videos refer to a product appearance video stream of the products under quality inspection recorded during a quality inspection period, the product appearance defect data refers to product reference defects in the appearance quality videos that are detected and annotated by the quality evaluation model, and the product appearance defect threshold refers to a critical value of the product appearance defects corresponding to the product quality incidents of the products under quality inspection.

Further, a specific method for obtaining the quality evaluation model is as follows: dividing the built appearance quality dataset into a model training set and a model test set according to a preset ratio, and designating personnel to perform data annotation of the appearance quality data in the model training set, where the data annotation is used to annotate both the products under quality inspection and product appearance defects in the appearance quality data; inputting the obtained model training set into both the preset model and the preset optimized model for training to obtain initial quality evaluation models, and testing the initial quality evaluation models using the model test set, where the preset optimized model is derived by optimizing the preset model; and obtaining a model performance coefficient of the initial quality evaluation models according to model training results and model test results, and filtering the initial quality evaluation models in combination with a model performance coefficient threshold to obtain the quality evaluation model; where the model performance coefficient is used to numerically describe model performance of the initial quality evaluation models.

Further, a specific method for obtaining the preset optimized model is as follows: analyzing the model training set with data annotation to obtain appearance defect size data, performing clustering analysis on the obtained appearance defect size data using a clustering method to obtain an anchor adjustment size, and replacing an initial anchor size in the preset model with the anchor adjustment size to obtain a first optimized model, where the appearance defect size data refers to pixel length and pixel width of the appearance defects with data annotation; and adjusting methods for filtering prediction boxes for the preset model and the first optimized model respectively using a suppression algorithm to obtain a second optimized model and a third optimized model, where the suppression algorithm include a non-maximum suppression algorithm and a soft non-maximum suppression algorithm. The preset optimized model includes the first optimized model, the second optimized model, and the third optimized model.

Further, a specific method for obtaining the model performance coefficient is as follows: obtaining a real-time model capability coefficient of the initial quality evaluation models by analyzing time consumed by model training and model test, where the real-time model capability coefficient is used to numerically describe real-time detection capability of the initial quality evaluation models; obtaining a model accuracy coefficient of the initial quality evaluation models by analyzing detection accuracy corresponding to the model test results, where the model accuracy coefficient is used to numerically describe detection accuracy of the initial quality evaluation models, and the detection accuracy includes detection accuracy of the products under quality inspection and detection accuracy of the corresponding product appearance defects; analyzing and identifying a degree of influence of detection accuracy coefficient deviation and real-time detection capability coefficient deviation on the initial quality evaluation models by using a weighting method to obtain a coefficient influence weight, where the coefficient influence weight includes accuracy weight and real-time capability weight, the detection accuracy coefficient deviation refers to a ratio of a difference between a detection accuracy coefficient of the initial quality evaluation models and a corresponding threshold to a difference between a first threshold of the detection accuracy coefficient and a threshold of the detection accuracy coefficient, and the real-time detection capability coefficient deviation refers to a ratio of a difference between a real-time detection coefficient of the initial quality evaluation models and a corresponding threshold to a difference between a first threshold of the real-time detection coefficient and a threshold of the real-time detection coefficient; and determining whether the obtained real-time model capability coefficient and model accuracy coefficient are greater than their corresponding thresholds, when the real-time model capability coefficient and model accuracy coefficient are not greater than the corresponding thresholds, it indicates that the model performance coefficient of the corresponding initial quality evaluation models is 0, otherwise, a model performance coefficient of the initial quality evaluation models is obtained renewedly by combining the coefficient influence weight derived from the weighting method.

Further, a specific process for model filtering is as follows: it is determined whether the model performance coefficient of the initial quality evaluation models is not less than the model performance coefficient threshold, when the model performance coefficient is less than the model performance coefficient threshold, it indicates that the corresponding initial quality evaluation models do not meet the requirements, otherwise, the corresponding models are designated as candidate quality evaluation models, and a model complexity coefficient of the candidate quality evaluation models is obtained, where the model complexity coefficient is used to numerically describe model complexity of the initial quality evaluation models. It is determined whether the model complexity coefficient of the candidate quality evaluation models is less than a model complexity coefficient threshold, when the model complexity coefficient is not less than the model complexity coefficient threshold, it indicates that the corresponding candidate quality evaluation models do not meet the requirements, otherwise, a comprehensive model coefficient of the candidate quality evaluation models is obtained in combination with the corresponding model performance coefficient, where the comprehensive model coefficient is used to numerically describe comprehensive performance of the candidate quality evaluation models. Finally, it is determined whether the comprehensive model coefficient of the candidate quality evaluation models is less than a corresponding threshold, when the comprehensive model coefficient is less than the corresponding threshold, it indicates that the corresponding candidate quality evaluation models do not meet the requirements, otherwise, the candidate quality evaluation models are ranked and filtered according to the comprehensive model coefficient to obtain the quality evaluation model.

Further, the model performance coefficient is calculated and obtained according to the following formula:

$$MP_m = \begin{cases} \left(\dfrac{e-1}{e+1}\right)^{1-\left(\alpha_1 * \frac{MZ_m - Z_0}{Z_1 - Z_0} + \alpha_2 * \frac{MS_m - S_0}{S_1 - S_0}\right)}, & MS_m > S_0 \text{ and } MZ_m > Z_0 \\ 0, & MS_m \leq S_0 \text{ or } MZ_m \leq Z_0 \text{ or} \\ & (MS_m \leq S_0 \text{ and } MZ_m \leq Z_0) \end{cases}$$

in the formula, e is a natural constant, m is an initial quality evaluation model number, where m=1, 2, ..., M, and M is a total number of the initial quality evaluation models; $MP_m$ is a model performance coefficient of an $m^{th}$ initial quality evaluation model, $MS_m$ is a real-time model capability coefficient of the $m^{th}$ initial quality evaluation model, $MZ_m$ is a model accuracy coefficient of the $m^{th}$ initial quality evaluation model, $S_0$ is a threshold of the real-time model capability coefficient of the initial quality evaluation models, $S_1$ is a first threshold of the real-time model capability coefficient of the initial quality evaluation models, $Z_0$ is a threshold of the model accuracy coefficient of the initial quality evaluation models, $Z_1$ is a first threshold of the model accuracy coefficient of the initial quality evaluation models, $\alpha_1$ is an accuracy weight, and $\alpha_2$ is real-time capability weight.

Further, the comprehensive model coefficient is calculated and obtained according to the following formula:

$$ZX_n = \begin{cases} \tanh\left[P_n + \left(\dfrac{1}{2}\right)^{\frac{F_n - F^1}{F^0 - F_n}}\right], & F^0 - F_n > 0 \\ 0, & F^0 - F_n \leq 0 \end{cases}$$

in the formula, n is a candidate quality evaluation model number, where n=1, 2, ..., N, and N is a total number of the candidate quality evaluation models; $ZX_n$ is a comprehensive model coefficient of an $n^{th}$ candidate quality evaluation model, $P_n$ is relative deviation of the model performance coefficient of the $n^{th}$ candidate quality evaluation model, $F_n$ is a model complexity coefficient of the $n^{th}$ candidate quality evaluation model, $F^0$ is a threshold of the model complexity coefficient, and $F^1$ is a first threshold of the model complexity coefficient.

Further, a specific method for obtaining the model complexity coefficient is as follows: obtaining a number of parameters of the candidate quality evaluation models, and obtaining relative deviation of the number of parameters of the candidate quality evaluation models in combination with a number of reference parameters of the quality evaluation model, where the relative deviation of the number of parameters refers to a ratio of a difference between the number of parameters and the number of reference parameters to the number of reference parameters; obtaining floating-point operation data from model training time of the candidate quality evaluation models and a number of floating-point operations per second, and obtaining relative deviation of the floating-point operations of the candidate quality evaluation models in combination with the model training time and a floating-point operation threshold obtained from a threshold corresponding to the number of floating-point operations per second, where the relative deviation of the floating-point operations is a ratio of a difference between the floating-point operation data and a corresponding threshold to the corresponding threshold; and obtaining relative deviation of resource consumption in combination with resource consumption data of the candidate quality evaluation models and a corresponding threshold, and finally obtaining the model complexity coefficient of the candidate quality evaluation models.

Further, a specific method for determining the number of product quality incidents for the products under quality inspection is as follows: obtaining appearance defect ratio and significant appearance defect ratio of the products under quality inspection by analyzing the product appearance defect data corresponding to the products under quality inspection in the appearance quality videos, where the appearance defect ratio denotes a ratio of a pixel area of product appearance defects of the products under quality inspection to a pixel area of the products under quality inspection, the significant appearance defect ratio denotes a ratio of a pixel area of significant product appearance defects of the product under quality inspection to the pixel area of the products under quality inspection, and the significant product appearance defects indicate that the corresponding pixel area is not less than a pixel area threshold of the product appearance defects; obtaining an appearance defect growth rate of the products under quality inspection by analyzing changes in a number of product appearance defects and corresponding changes in the pixel area of significant product appearance defects during the quality inspection period, where the appearance defect growth rate includes a quantity growth rate and an area growth rate, the quantity growth rate denotes an increase in the number of product appearance defects of the products under quality inspection, and the area growth rate denotes an increase in the pixel area of significant product appearance defects of the products under quality inspection; and obtaining an incident occurrence coefficient of the products under quality inspection in combination with the appearance defect ratio, the significant appearance defect ratio and the appearance defect growth rate, where the incident occurrence coefficient is used to numerically describe probability of the product quality incidents occurring among the products under quality inspection. It is determined whether the incident occurrence coefficient of the products under quality is not less than an incident occurrence threshold, when the incident occurrence coefficient is indeed not less than the incident occurrence threshold, it indicates that the products under quality inspection will have the product quality incidents, otherwise, it indicates that the products under quality inspection will not have the product quality incidents, and a number of product quality incidents of the products under quality inspection during the monitoring period is obtained through comparative analysis.

Further, the incident occurrence coefficient is calculated and obtained according to the following formula:

$$SX_h = \begin{cases} 1, & WZ_h \geq W_0 XZ_h \geq X_0 \text{ or} \\ & (WZ_h \geq W_0 XZ_h \geq X_0) \\ \left(\dfrac{1}{\sqrt{e-2}}\right)^{\frac{(1+SR_h)*WZ_h - W_0}{W_0} + \frac{\sqrt[3]{(1+XR_h)*XZ_h - X_0}}{X_0}}, & WZ_h < W_0 \text{ and } XZ_h < X_0 \end{cases}$$

in the formula, e is a natural constant, h is a product number of the products under quality inspection during the monitoring period, where h=1, 2, ..., H, and H is a total number of the products under quality inspection during the monitoring period; $SX_h$ is an incident occurrence coefficient of an $h^{th}$ product under quality inspection during the monitoring period, $WZ_h$ is an appearance defect ratio of the $h^{th}$ product under quality inspection during the monitoring period, $XZ_h$ is a significant appearance defect ratio of the $h^{th}$ product under quality inspection during the monitoring period, $SR_h$ is a quantity growth rate of the $h^{th}$ product under quality inspection during the monitoring period, $XR_h$ is an area growth rate of the $h^{th}$ product under quality inspection during the monitoring period, $W_0$ is a threshold of the appearance defect ratio of the products under quality inspection, and $X_0$ is a threshold of the significant appearance defect ratio of the products under quality inspection.

One or more of the technical solutions provided in the embodiments of the present disclosure at least have the following technical effects or advantages:

1. an appearance quality dataset is built using the acquired appearance quality data of products under quality inspection, a preset model and a preset optimized model are trained and validated using the appearance quality dataset, and models are filtered to obtain a quality evaluation model; product appearance defect data are obtained through the quality evaluation model, appearance defect ratio and significant appearance defect ratio of the products under quality inspection are obtained according to the product appearance defect data, and a number of product quality incidents is determined according to an incident occurrence coefficient obtained by an appearance defect growth rate, thereby improving the accuracy of determining the product quality incidents and effectively solving the problem of low accuracy in determining the number of product quality incidents in the prior art.

2. The built appearance quality dataset is divided into a model training set and a model test set, data annotation is performed to obtain a model training set, the model training set is inputted into both the preset model and the preset optimized model for training to obtain initial quality evaluation models, the trained model is tested using the model test set at the same time, and the models are filtered to obtain a quality evaluation is obtained according to a model performance coefficient of the initial quality evaluation models and the corresponding threshold thereof, thereby filtering a more accurate quality evaluation model.

3. A number of parameters of the candidate quality evaluation models are obtained by, acquiring relative deviation of the number of parameters and reference parameters of the candidate quality evaluation models, relative deviation of floating-point operations of the candidate quality evaluation models is obtained through the acquired model training time, a number of floating-point operations per second and a corresponding threshold, relative deviation of resource consumption data is obtained according to resource consumption data of the candidate quality evaluation models and a corresponding threshold, a model complexity coefficient is obtained to evaluate a degree of model complexity is determined according to the acquired data, thereby achieving numerical and accurate evaluation of the model complexity of the candidate quality evaluation models, and filtering a more accurate quality evaluation model.

DETAILED DESCRIPTIONS OF THE EMBODIMENTS

Figure 1:
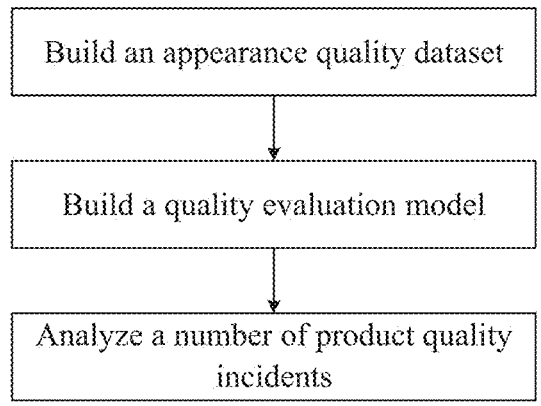
FIG. 1 is flowchart of a method for determining a number of product quality incidents based on a convolutional neural network according to an embodiment of the present disclosure.

The embodiments of the present disclosure provide a method for determining a number of product quality incidents based on a convolutional neural network (CNN), addressing the problem of low accuracy in determining the number of product quality incidents in the prior art. The method specifically includes the following steps: preprocessing acquired appearance quality data of products under quality inspection to build an appearance quality dataset, dividing the appearance quality dataset into a model training set and a model test set according to a preset ratio, designating personnel to perform data annotation of appearance quality data in the model training set, and optimizing a preset model to obtain a preset optimized model; inputting the model training set into both the preset model and the preset optimized model for training to obtain initial quality evaluation models, testing the initial quality evaluation models using the model test set at the same time, then obtaining a model performance coefficient of the initial quality evaluation models, filtering the initial quality evaluation models in combination with a model performance coefficient of candidate quality evaluation models to obtain a corresponding comprehensive model coefficient, and then filtering the candidate quality evaluation models in combination with a threshold of the comprehensive model coefficient to obtain a quality evaluation model; and obtaining product appearance defect data through appearance quality videos of the products under quality inspection detected and photographed by the quality evaluation model, obtaining appearance defect ratio and significant appearance defect ratio of the products under quality inspection according to the product appearance defect data, then calculating an incident occurrence coefficient of the products under quality inspection in combination with an appearance defect growth rate, and finally obtaining the number of product quality incidents within a monitoring period according to the incident occurrence coefficient and a corresponding incident occurrence threshold, thereby improving the accuracy of determining the product quality incidents.

In order to solve the problem of low accuracy in determining the number of product quality incidents, the general idea of the technical solution in an embodiment of the present disclosure is as follows:

an appearance quality dataset is built using the acquired appearance quality data of products under quality inspection, and a preset model and a preset optimized model are trained and validated using the appearance quality dataset to obtain initial quality evaluation models, which are filtered to obtain a quality evaluation model; product appearance defect data are obtained by detecting appearance quality videos of the products under quality inspection through the quality evaluation model, appearance defect ratio and significant appearance defect ratio of the products under quality inspection are obtained according to the product appearance defect data, an incident occurrence coefficient of the products under quality inspection is obtained in combination with an appearance defect growth rate, and analysis is performed to finally determine a number of product quality incidents, thereby improving the accuracy of determining the product quality incidents.

In order to better understand the above technical solution, the above technical solution will be described in detail below with reference to the accompanying drawings and specific implementations.

FIG. 1 is flowchart of a method for determining a number of product quality incidents based on a convolutional neural network according to an embodiment of the present disclosure. Specifically, the method includes the following steps: obtaining appearance quality data of products under quality inspection to build an appearance quality dataset, where the appearance quality dataset is a collection of preprocessed appearance quality data, the appearance quality data is image data describing quality of the products under quality inspection, and the quality of the products under quality inspection is related to corresponding product appearance defects; training and validating a preset model using the built appearance quality dataset to obtain a quality evaluation model, where the quality evaluation model is used to obtain the product appearance defects of the products under quality inspection, and the preset model is an anchor-based model in the convolutional neural network and has an object detection function; obtaining product appearance defect data through appearance quality videos of the products under quality inspection detected and photographed by the quality evaluation model, and obtaining the number of product quality incidents of the products under quality inspection by analyzing the product appearance defect data in combination with a product appearance defect threshold, where the appearance quality videos refer to a product appearance video stream of the products under quality inspection recorded during a quality inspection period, the product appearance defect data refers to product reference defects in the appearance quality videos that are detected and annotated by the quality evaluation model, and the product appearance defect threshold refers to a critical value of the product appearance defects corresponding to the product quality incidents of the products under quality inspection.

In this embodiment, preprocessing usually includes cropping and contrast adjustment, where the cropping aims to ensure that a number of products under quality inspection in the appearance quality data remains at an appropriate ratio, while a purpose of the contrast adjustment is to highlight the product appearance defects of the products under quality inspection. Generally, only a part of the appearance quality data requires preprocessing. The appearance of the products under quality inspection can clearly reflect product quality, that is, the more obvious the appearance defects is, the worse the corresponding product quality becomes. A critical value is used to determine product quality incidents, and the critical value is determined by professionals based on analysis of massive data. The appearance quality data may contain a plurality of products under quality inspection, and the products under quality inspection may contain a plurality of appearance defects, therefore, the method can improve the accuracy of determining the number of product quality incidents.

Figure 2:
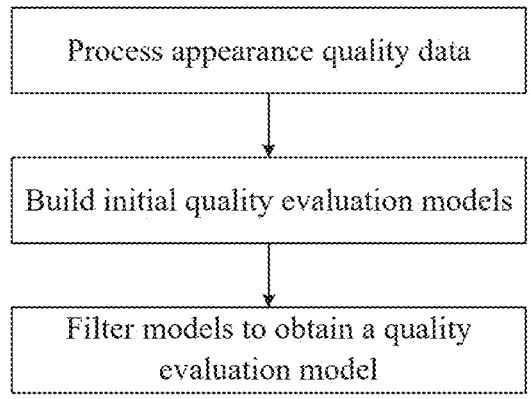
FIG. 2 is a flowchart for obtaining a quality evaluation model according to an embodiment of the present disclosure.

Further, FIG. 2 is a flowchart for obtaining the quality evaluation model according to an embodiment of the present disclosure. A specific method for obtaining the quality evaluation model is as follows: dividing the built appearance quality dataset into a model training set and a model test set according to a preset ratio, and designating personnel to perform data annotation of the appearance quality data in the model training set, where the data annotation is used to annotate both the products under quality inspection and product appearance defects in the appearance quality data; inputting the obtained model training set into both the preset model and the preset optimized model for training to obtain initial quality evaluation models, and testing the initial quality evaluation models using the model test set, where the preset optimized model is derived by optimizing the preset model; and obtaining a model performance coefficient of the initial quality evaluation models according to model training results and model test results, and filtering the initial quality evaluation models in combination with a model performance coefficient threshold to obtain the quality evaluation model; where the model performance coefficient is used to numerically describe model performance of the initial quality evaluation models.

In this embodiment, the preset model can directly regress quantity information and location information of a target object in an image, such as classical R-CNN series and YOLO series. The model performance refers to detection accuracy and real-time detection capability, both of which have an impact on the determination of the number of product quality incidents. Therefore, it is necessary to accurately and timely detect product quality incidents to prevent more severe application failures, obtaining a more accurate quality evaluation model.

Further, a specific method for obtaining the preset optimized model is as follows: analyzing the model training set with data annotation to obtain appearance defect size data, performing clustering analysis on the obtained appearance defect size data using a clustering method to obtain an anchor adjustment size, and replacing an initial anchor size in the preset model with the anchor adjustment size to obtain a first optimized model, where the appearance defect size data refers to pixel length and pixel width of the appearance defects with data annotation; and adjusting methods for filtering prediction boxes for the preset model and the first optimized model respectively using a suppression algorithm to obtain a second optimized model and a third optimized model, where the suppression algorithm include a non-maximum suppression algorithm and a soft non-maximum suppression algorithm. The preset optimized model includes the first optimized model, the second optimized model, and the third optimized model.

In this embodiment, the clustering method includes partition-based clustering, hierarchical-based clustering, density-based clustering, or graph-based clustering. The partition-based clustering is generally selected, and common algorithms include k-means, k-medoids, and k-prototype algorithm. A purpose of clustering is to obtain a more accurate anchor size, as an initial anchor size may not be suitable for the products under quality inspection and the appearance defects thereof. The prediction box contains both the products under quality inspection and the corresponding appearance defects thereof, the suppression algorithm is mainly used to solve an overlapping problem, the first optimized model is a preset model for adjusting the anchor size, the second optimized model is a model for adjusting the method of the preset model to filter the prediction box, and the third optimized model is a model for adjusting the first optimized model to filter the prediction box, such that the a matching degree between the preset model, the products under quality inspection, and the product appearance defects is improved.

Further, a specific method for obtaining the model performance coefficient is as follows: obtaining a real-time model capability coefficient of the initial quality evaluation models by analyzing time consumed by model training and model test, where the real-time model capability coefficient is used to numerically describe real-time detection capability of the initial quality evaluation models; obtaining a model accuracy coefficient of the initial quality evaluation models by analyzing detection accuracy corresponding to the model test results, where the model accuracy coefficient is used to numerically describe detection accuracy of the initial quality evaluation models, and the detection accuracy includes detection accuracy of the products under quality inspection and detection accuracy of the corresponding product appearance defects; analyzing and identifying a degree of influence of detection accuracy coefficient deviation and real-time detection capability coefficient deviation on the initial quality evaluation models by using a weighting method to obtain a coefficient influence weight, where the coefficient influence weight includes accuracy weight and real-time capability weight, the detection accuracy coefficient deviation refers to a ratio of a difference between a detection accuracy coefficient of the initial quality evaluation models and a corresponding threshold to a difference between a first threshold of the detection accuracy coefficient and a threshold of the detection accuracy coefficient, and the real-time detection capability coefficient deviation refers to a ratio of a difference between a real-time detection coefficient of the initial quality evaluation models and a corresponding threshold to a difference between a first threshold of the real-time detection coefficient and a threshold of the real-time detection coefficient; and determine whether the obtained real-time model capability coefficient and model accuracy coefficient are greater than their corresponding thresholds, when the real-time model capability coefficient and model accuracy coefficient are not greater than the corresponding thresholds, it indicates that the model performance coefficient of the corresponding initial quality evaluation models is 0, otherwise, a model performance coefficient of the initial quality evaluation models is obtained renewedly by combining the coefficient influence weight derived from the weighting method.

In this embodiment, the coefficient influence weight indicates a degree of impact of the detection accuracy coefficient deviation and real-time detection capability coefficient deviation on the model performance coefficient of the initial quality evaluation models. The accuracy weight indicates a degree of impact of the model accuracy coefficient deviation on the model performance coefficient of the initial quality evaluation models, while the real-time capability weight indicates a degree of impact of the real-time model capability coefficient deviation on the model performance coefficient of the initial quality evaluation models. The first threshold of the detection accuracy coefficient and the first threshold of the real-time detection coefficient are both greater than their corresponding thresholds, ideally having a value of 1, which, however, can be adjusted according to actual conditions, such that a more comprehensive evaluation of the model performance of the initial quality evaluation models is achieved.

Further, a specific process for model filtering is as follows: it is determined whether the model performance coefficient of the initial quality evaluation models is not less than the model performance coefficient threshold, when the model performance coefficient is less than the model performance coefficient threshold, it indicates that the corresponding initial quality evaluation models do not meet the requirements, otherwise, the corresponding models are designated as candidate quality evaluation models, and a model complexity coefficient of the candidate quality evaluation models is obtained, where the model complexity coefficient is used to numerically describe model complexity of the initial quality evaluation models. It is determined whether the model complexity coefficient of the candidate quality evaluation models is less than a model complexity coefficient threshold, when the model complexity coefficient is not less than the model complexity coefficient threshold, it indicates that the corresponding candidate quality evaluation models do not meet the requirements, and a comprehensive model coefficient is 0, otherwise, a comprehensive model coefficient of the candidate quality evaluation models is obtained in combination with the corresponding model performance coefficient, where the comprehensive model coefficient is used to numerically describe comprehensive performance of the candidate quality evaluation models. Finally, it is determined whether the comprehensive model coefficient of the candidate quality evaluation models is less than a corresponding threshold, when the comprehensive model coefficient is less than the corresponding threshold, it indicates that the corresponding candidate quality evaluation models do not meet the requirements, otherwise, the candidate quality evaluation models are ranked and filtered according to the comprehensive model coefficient to obtain the quality evaluation model.

In this embodiment, the requirements stated herein refer to the necessary conditions that the quality evaluation model must meet in terms of detection accuracy, real-time detection capability, and model complexity; the model performance coefficient of the candidate quality evaluation models is not less than the model performance coefficient threshold; the comprehensive model coefficient refers to comprehensive description of model performance and model complexity; and the quality evaluation model is a model with a highest comprehensive model coefficient among the candidate quality evaluation models, such that the initial quality evaluation model is filtered more accurately.

Further, in addition to being obtained by analyzing accuracy rate, recall rate, and the like, the model performance coefficient can also be calculated more precisely. The model performance coefficient is calculated and obtained according to the following formula:

$$MP_m = \begin{cases} \left(\dfrac{e-1}{e+1}\right)^{1-\left(\alpha_1 * \frac{MZ_m - Z_0}{Z_1 - Z_0} + \alpha_2 * \frac{MS_m - S_0}{S_1 - S_0}\right)}, & MS_m > S_0 \text{ and } MZ_m > Z_0 \\ 0, & MS_m \le S_0 \text{ or } MZ_m \le Z_0 \text{ or} \\ & (MS_m \le S_0 \text{ and } MZ_m \le Z_0) \end{cases}$$

in the formula, e is a natural constant, m is an initial quality evaluation model number, where m=1, 2, ..., M, and M is a total number of the initial quality evaluation models; $MP_m$ is a model performance coefficient of an $m^{th}$ initial quality evaluation model, $MS_m$ is a real-time model capability coefficient of the $m^{th}$ initial quality evaluation model, $MZ_m$ is a model accuracy coefficient of the $m^{th}$ initial quality evaluation model, $S_0$ is a threshold of the real-time model capability coefficient of the initial quality evaluation models, $S_1$ is a first threshold of the real-time model capability coefficient of the initial quality evaluation models, $Z_0$ is a threshold of the model accuracy coefficient of the initial quality evaluation models, $Z_1$ is a first threshold of the model accuracy coefficient of the initial quality evaluation models, $\alpha_1$ is an accuracy weight, and $\alpha_2$ is real-time capability weight.

In this embodiment, the model accuracy coefficient cannot only be directly obtained from accuracy but can also be calculated more precisely. The model accuracy coefficient is calculated and obtained according to the following formula:

$$MZ_m = \log_2\left[mAP_m + \sqrt{\frac{\sum_{p=1}^{Q}\left(\frac{Z_{m.p}^1 + Z_{m.p}^2}{2} + \frac{\sum_{p.r=p.1}^{p.Rpr} IoU_m^{p.r}}{p.R} + \frac{\sum_{pt=p.1}^{p.T} IoU_m^{p.t}}{p.T}\right)}{3*Q}} + 1\right],$$

in the formula, p is an appearance quality data number in the model test set, where p=1, 2, . . . , Q, and Q is a total number of appearance quality data in the model test set; p.r is a product number of products under quality inspection of a $p^{th}$ appearance quality data in the model test set, where p.r=p.1, p.2, . . . , p.R, and p.R is a total number of products under quality inspection of the $p^{th}$ appearance quality data in the model test set; p.t is a product appearance defect number of the $p^{th}$ appearance quality data in the model test set; where p.t=p.1, p.2, . . . , p.T, and p.T is a total number of product appearance defects of the $p^{th}$ appearance quality data in the model test set; $mAP_m$ is an mAP obtained through model test using the $m^{th}$ initial quality evaluation model, $Z_{m.p}^1$ is a quantity accuracy of the products under quality inspection of the $p^{th}$ appearance quality data in the model test set detected by the $m^{th}$ initial quality evaluation model; $Z_{m.p}^2$ is a quantity accuracy of the product appearance defects of the $p^{th}$ appearance quality data in the model test set detected by the $m^{th}$ initial quality evaluation model; $IoU_m^{p.r}$ is intersection-over-union data of a $p.r^{th}$ product under quality inspection of the $p^{th}$ appearance quality data in the model test set detected by the $m^{th}$ initial quality evaluation model; and $IoU_m^{p.t}$ is intersection-over-union data of a $p.t^{th}$ product under quality inspection of the $p^{th}$ appearance quality data in the model test set detected by the $m^{th}$ initial quality evaluation model.

Specifically, in addition to being obtained by analyzing the model test time, the real-time model capability coefficient can also be calculated more precisely. The real-time model capability coefficient is calculated and obtained according to the following formula:

$$MS_m = \begin{cases} \left(\frac{1}{\sqrt{e-2}}\right)^{1-\frac{MT_m + \frac{1}{P}\times\sum_{p=1}^{P} JT_m^p}{T_0}}, & MT_m \leq MT_0, \\ 0, & MT_m > MT_0 \end{cases}$$

in the formula, $MT_m$ is model training time of the $m^{th}$ initial quality evaluation model, $MT_0$ is a threshold of the model training time, $JT_m^p$ is test time of the $p^{th}$ appearance quality data in the model test set detected by the $m^{th}$ initial quality evaluation model, and $T_0$ is a threshold of total model time, which is a sum of the model training time and the model test time, such that a more intuitive and accurate evaluation of the model performance of the initial quality evaluation models is achieved.

Specifically, in addition to being obtained by analyzing a number of model parameters and the model accuracy, the comprehensive model coefficient can also be calculated more precisely. The comprehensive model coefficient is calculated and obtained according to the following formula:

$$ZX_n = \begin{cases} \tanh\left[P_n + \left(\frac{1}{2}\right)^{\frac{F_n - F^1}{F^0 - F_n}}\right], & F^0 - F_n > 0, \\ 0, & F^0 - F_n \leq 0 \end{cases}$$

in the formula, n is a candidate quality evaluation model number, where n=1, 2, . . . , N, and N is a total number of the candidate quality evaluation models; $ZX_n$ is a comprehensive model coefficient of an $n^{th}$ candidate quality evaluation model, $P_n$ is relative deviation of the model performance coefficient of the $n^{th}$ candidate quality evaluation model, $F_n$ is a model complexity coefficient of the $n^{th}$ candidate quality evaluation model, $F^0$ is a threshold of the model complexity coefficient, and $F^1$ is a first threshold of the model complexity coefficient.

In this embodiment, the first threshold of the model complexity coefficient is less than the threshold of the model complexity coefficient, which is equivalent to a most ideal scenario. The relative deviation of the model performance coefficient denotes a ratio of a difference between the model performance coefficient and the model performance coefficient threshold to the model performance coefficient threshold, the comprehensive model coefficient increases as the relative deviation of the model performance coefficient increases, and decreases as the model complexity coefficient increases, thereby achieving numerical and accurate evaluation of the comprehensive performance of the candidate quality evaluation models.

Figure 3:
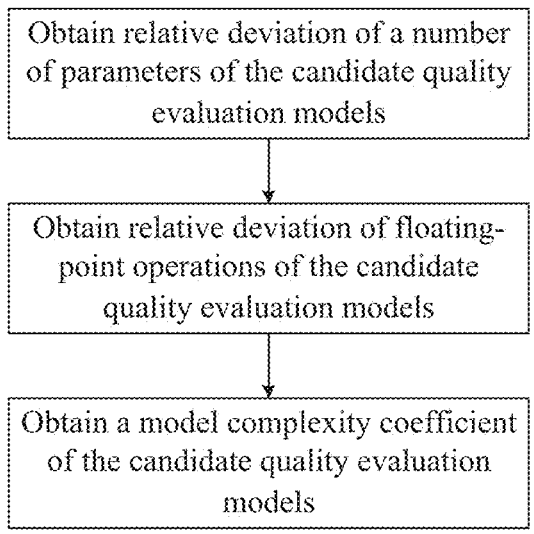
FIG. 3 is a flowchart for obtaining a model complexity coefficient according to an embodiment of the present disclosure.

Further, FIG. 3 is a flowchart for obtaining the model complexity coefficient according to an embodiment of the present disclosure. A specific method for obtaining the model complexity coefficient is as follows: obtaining a number of parameters of the candidate quality evaluation models, and obtaining relative deviation of the number of parameters of the candidate quality evaluation models in combination with a number of reference parameters of the quality evaluation model, where the relative deviation of the number of parameters refers to a ratio of a difference between the number of parameters and the number of reference parameters to the number of reference parameters; obtaining floating-point operation data from model training time of the candidate quality evaluation models and a number of floating-point operations per second, and obtaining relative deviation of the floating-point operations of the candidate quality evaluation models in combination with the model training time and a floating-point operation threshold obtained from a threshold corresponding to the number of floating-point operations per second, where the relative deviation of the floating-point operations is a ratio of a difference between the floating-point operation data and a corresponding threshold to the corresponding threshold; and obtaining relative deviation of resource consumption in combination with resource consumption data of the candidate quality evaluation models and a corresponding threshold, and finally obtaining the model complexity coefficient of the candidate quality evaluation models.

In this embodiment, in addition to be obtained by directly analyzing the number of parameters of the model, the model complexity coefficient can also be calculated more precisely. The model complexity coefficient is calculated and obtained according to the following formula:

$$F_n = \begin{cases} \log_{\left(\frac{1}{e}\right)}\left(\sqrt[3]{CP_n} + FP_n + \sqrt{ZP_n} + \frac{1}{e}\right), & FP_n \leq FP_0 \\ 0, & FP_n > FP_0 \end{cases},$$

in the formula, e is a natural constant, $CP_n$ is relative deviation of a number of parameters of an $n^{th}$ candidate quality evaluation model, $FP_n$ is relative deviation of floating-point operations of the $n^{th}$ candidate quality evaluation model, $FP_0$ is a threshold of the relative deviation of floating-point operations, and $ZP_n$ is relative deviation of resource consumption of the $n^{th}$ candidate quality evaluation model.

Specifically, a number of the candidate quality evaluation models is not greater than a number of the initial quality evaluation models; the floating-point operation data refers to a product of the model training time and the number of floating-point operations per second; the floating-point operation threshold refers to a product of the model training time and the threshold corresponding to the number of floating-point operations per second; and the relative deviation of resource consumption denotes a ratio of a difference between the resource consumption data of the candidate quality evaluation models and the corresponding threshold to the corresponding threshold, thereby achieving numerical and accurate evaluation of the model complexity of the candidate quality evaluation models.

Further, a specific method for determining the number of product quality incidents for the products under quality inspection is as follows: obtaining appearance defect ratio and significant appearance defect ratio of the products under quality inspection by analyzing the product appearance defect data corresponding to the products under quality inspection in the appearance quality videos, where the appearance defect ratio denotes a ratio of a pixel area of product appearance defects of the products under quality inspection to a pixel area of the products under quality inspection, the significant appearance defect ratio denotes a ratio of a pixel area of significant product appearance defects of the product under quality inspection to the pixel area of the products under quality inspection, and the significant product appearance defects indicate that the corresponding pixel area is not less than a pixel area threshold of the product appearance defects; obtaining an appearance defect growth rate of the products under quality inspection by analyzing changes in a number of product appearance defects and corresponding changes in the pixel area of significant product appearance defects during the quality inspection period, where the appearance defect growth rate includes a quantity growth rate and an area growth rate, the quantity growth rate denotes an increase in the number of product appearance defects of the products under quality inspection, and the area growth rate denotes an increase in the pixel area of significant product appearance defects of the products under quality inspection; and obtaining an incident occurrence coefficient of the products under quality inspection in combination with the appearance defect ratio, the significant appearance defect ratio and the appearance defect growth rate, where the incident occurrence coefficient is used to numerically describe probability of the product quality incidents occurring among the products under quality inspection. It is determined whether the incident occurrence coefficient of the products under quality is not less than an incident occurrence threshold, when the incident occurrence coefficient is indeed not less than the incident occurrence threshold, it indicates that the products under quality inspection will have the product quality incidents, otherwise, it indicates that the products under quality inspection will not have the product quality incidents, and a number of product quality incidents of the products under quality inspection during the monitoring period is obtained through comparative analysis.

In this embodiment, the appearance defect growth rate denotes a growth rate of product appearance defects of the products under quality inspection during the quality inspection period, specifically including a quantity growth rate and an area growth rate. When the number of product appearance defects of the products under quality inspection increases rapidly, a product quality incident may occur soon, even if no significant quality problems are identified among the products under quality inspection at a current moment. Similarly, when the area growth rate of significant product appearance defects increases rapidly, a product quality incident is likely to happen quickly as well, thereby achieving a more accurate determination of the number of product quality incidents for the products under quality inspection.

Further, in addition to being obtained by analyzing a ratio of the product appearance defects in the products under quality inspection, the incident occurrence coefficient is calculated and obtained according to the following formula:

$$SX_h = \begin{cases} 1, & WZ_h \geq W_0 XZ_h \geq X_0 \text{ or} \\ & (WZ_h \geq W_0 \text{ and } XZ_h \geq X_0) \\ \left(\frac{1}{\sqrt{e-2}}\right)^{\frac{(1+SR_h)*WZ_h - W_0}{W_0} + \frac{\sqrt[3]{(1+XR_h)*XZ_h - X_0}}{X_0}}, & WZ_h < W_0 \text{ and } XZ_h < X_0 \end{cases},$$

in the formula, e is a natural constant, h is a product number of the products under quality inspection during the monitoring period, where h=1, 2, . . . , H, and H is a total number of the products under quality inspection during the monitoring period; $SX_h$ is an incident occurrence coefficient of an $h^{th}$ product under quality inspection during the monitoring period, $WZ_h$ is an appearance defect ratio of the $h^{th}$ product under quality inspection during the monitoring period, $XZ_h$ is a significant appearance defect ratio of the $h^{th}$ product under quality inspection during the monitoring period, $SR_h$ is a quantity growth rate of the $h^{th}$ product under quality inspection during the monitoring period, $XR_h$ is an area growth rate of the $h^{th}$ product under quality inspection during the monitoring period, $W_0$ is a threshold of the appearance defect ratio of the products under quality inspection, and $X_0$ is a threshold of the significant appearance defect ratio of the products under quality inspection.

In this embodiment, the greater the incident occurrence coefficient is, the higher the probability of a product quality incident occurs among the products under quality inspection, and the threshold of the appearance defect ratio and the threshold of the significant appearance defect ratio correspond to a critical value of product quality incidents; and the incident occurrence coefficient increases when the appearance defect ratio, the significant appearance defect ratio, the quantity growth rate, and the area growth rate increase, thereby achieving a more accurate and intuitive description of the probability of a product quality incident of the products under quality inspection.

The technical solution in this embodiment of the present disclosure has at least the following technical effects or advantages: compared with the patent (Publication No. CN114881329B) titled a tire quality prediction method and system based on a guided graph convolutional neural network, the present disclosure has the advantages: in an embodiment of the present disclosure, the built appearance quality dataset is divided into a model training set and a model test set, data annotation is performed to obtain a model training set, the model training set is inputted into both the preset model and the preset optimized model for training to obtain initial quality evaluation models, the trained model is tested using the model test set at the same time, and the models are filtered to obtain a quality evaluation is obtained according to a model performance coefficient of the initial quality evaluation models and the corresponding threshold thereof, thereby filtering a more accurate quality evaluation model. Compared with the patent (Publication No.: CN117557157A) titled a quality assessment and evaluation method based on a convolutional neural network, including determining a reference product, the present disclosure has the advantages: in an embodiment of the present disclosure, a number of parameters of the candidate quality evaluation models are obtained by, acquiring relative deviation of the number of parameters and reference parameters of the candidate quality evaluation models, relative deviation of floating-point operations of the candidate quality evaluation models is obtained through the acquired model training time, a number of floating-point operations per second and a corresponding threshold, relative deviation of resource consumption data is obtained according to resource consumption data of the candidate quality evaluation models and a corresponding threshold, a model complexity coefficient is obtained to evaluate a degree of model complexity is determined according to the acquired data, thereby achieving numerical and accurate evaluation of the model complexity of the candidate quality evaluation models, and filtering a more accurate quality evaluation model.

Those skilled in the art should understand that the examples of the present disclosure may be provided as methods, systems, or computer program products. Therefore, the present disclosure may employ full hardware examples, full software examples, or software and hardware combined examples. Moreover, the present disclosure may take the form of a computer program product implemented on one or more computer usable storage media (including, but not limited to, disk memories, CD-ROM, optical memories, and the like) containing computer usable program codes.

The present disclosure is described with reference to flowcharts and/or block diagrams of methods, devices (systems), and computer program products according to the examples of the present disclosure. It should be understood that each flow and/or block in the flow diagrams and/or block diagrams and combinations of the flows and/or blocks in the flowcharts and/or block diagrams may be implemented by computer program instructions. These computer program instructions may be provided for a processor of a general-purpose computer, a special-purpose computer, an embedded processor, or other programmable data processing devices to produce a machine, such that instructions executed by the processor of the computer or other programmable data processing devices produce an apparatus used for implementing functions specified in one or more flows of the flowcharts and/or one or more blocks of the block diagrams.

These computer program instructions may also be stored in a computer readable memory that may guide a computer or other programmable data processing devices to work in a specific manner, such that the instructions stored in the computer readable memory produce an article of manufacture including an instruction device, and the instruction device implements functions specified in one or more flows of the flowcharts and/or one or more blocks of the block diagrams.

These computer program instructions may be loaded onto a computer or another programmable data processing device, such that a series of operations and steps are performed on the computer or the another programmable device, thereby generating computer-implemented processing. Therefore, the instructions executed on the computer or another programmable device provide steps for implementing a specific function in one or more flows of the flowcharts and/or in one or more blocks of the block diagrams.

Although the preferential embodiments of the present disclosure have been described, those skilled in the art may make additional changes and modifications to these embodiments once they learn the basic inventive concept. Therefore, the appended claims are intended to be interpreted as including the preferential embodiments and all changes and modifications falling within the scope of the present disclosure.

It will be apparent to those skilled in the art that various modifications and variations may be made to the present disclosure without departing from the spirit and scope of the present disclosure. Therefore, it is intended that the present disclosure covers such modifications and variations which come within the scope of the appended claims and their equivalents.

The invention claimed is:

1. A method for determining a number of product quality incidents based on a convolutional neural network, comprising:

obtaining appearance quality data of products under quality inspection to build an appearance quality dataset, wherein the appearance quality dataset is a collection of preprocessed appearance quality data, the appearance quality data is image data describing quality of the products under quality inspection, and the quality of the products under quality inspection is related to corresponding product appearance defects;

training and validating a preset model using the built appearance quality dataset to obtain a quality evaluation model, wherein the quality evaluation model is used to obtain the product appearance defects of the products under quality inspection, and the preset model is an anchor-based model in the convolutional neural network and has an object detection function;

obtaining product appearance defect data through appearance quality videos of the products under quality inspection detected and photographed by the quality evaluation model, and obtaining the number of product quality incidents of the products under quality inspection by analyzing the product appearance defect data in combination with a product appearance defect threshold, wherein the appearance quality videos refer to a product appearance video stream of the products under quality inspection recorded during a quality inspection period, the product appearance defect data refers to product reference defects in the appearance quality videos that are detected and annotated by the quality evaluation model, and the product appearance defect threshold refers to a critical value of the product appearance defects corresponding to the product quality incidents of the products under quality inspection;

a specific method for obtaining the quality evaluation model is as follows:

dividing the built appearance quality dataset into a model training set and a model test set according to a preset ratio, and designating personnel to perform data annotation of the appearance quality data in the model training set, wherein the data annotation is used to annotate both the products under quality inspection and product appearance defects in the appearance quality data;

inputting the obtained model training set into both the preset model and a preset optimized model for training to obtain initial quality evaluation models, and testing the initial quality evaluation models using the model test set, wherein the preset optimized model is derived by optimizing the preset model;

obtaining a model performance coefficient of the initial quality evaluation models according to model training results and model test results, and filtering the initial quality evaluation models in combination with a model performance coefficient threshold to obtain the quality evaluation model; wherein the model performance coefficient is used to numerically describe model performance of the initial quality evaluation models;

the model performance coefficient is calculated and obtained according to the following formula:

$$MP_m = \begin{cases} \left(\dfrac{e-1}{e+1}\right)^{1-\left(\alpha_1 * \frac{MZ_m - Z_0}{Z_1 - Z_0} + \alpha_2 * \frac{MS_m - S_0}{S_1 - S_0}\right)}, & MS_m > S_0 \text{ and } MZ_m > Z_0 \\ 0, & MS_m \leq S_0 \text{ or } MZ_m \leq Z_0 \text{ or} \\ & (MS_m \leq S_0 \text{ and } MZ_m \leq Z_0) \end{cases}$$

in the formula, e is a natural constant, m is an initial quality evaluation model number, wherein m=1, 2, ..., M, and M is a total number of the initial quality evaluation models; $MP_m$ is a model performance coefficient of an $m^{th}$ initial quality evaluation model, $MS_m$ is a real-time model capability coefficient of the $m^{th}$ initial quality evaluation model, $MZ_m$ is a model accuracy coefficient of the $m^{th}$ initial quality evaluation model, $S_0$ is a threshold of a real-time model capability coefficient of the initial quality evaluation models, $S_1$ is a first threshold of the real-time model capability coefficient of the initial quality evaluation models, $Z_0$ is a threshold of the model accuracy coefficient of the initial quality evaluation models, $Z_1$ is a first threshold of the model accuracy coefficient of the initial quality evaluation models, $\alpha_1$ is an accuracy weight, and $\alpha_2$ is real-time capability weight;

a specific method for determining the number of product quality incidents for the products under quality inspection is as follows:

obtaining appearance defect ratio and significant appearance defect ratio of the products under quality inspection by analyzing the product appearance defect data corresponding to the products under quality inspection in the appearance quality videos, wherein the appearance defect ratio denotes a ratio of a pixel area of product appearance defects of the products under quality inspection to a pixel area of the products under quality inspection, the significant appearance defect ratio denotes a ratio of a pixel area of significant product appearance defects of the product under quality inspection to the pixel area of the products under quality inspection, and the significant product appearance defects indicate that the corresponding pixel area is not less than a pixel area threshold of the product appearance defects;

obtaining an appearance defect growth rate of the products under quality inspection by analyzing changes in a number of product appearance defects and corresponding changes in the pixel area of significant product appearance defects during the quality inspection period, wherein the appearance defect growth rate comprises a quantity growth rate and an area growth rate, the quantity growth rate denotes an increase in the number of product appearance defects of the products under quality inspection, and the area growth rate denotes an increase in the pixel area of significant product appearance defects of the products under quality inspection;

obtaining an incident occurrence coefficient of the products under quality inspection in combination with the appearance defect ratio, the significant appearance defect ratio and the appearance defect growth rate, wherein the incident occurrence coefficient is used to numerically describe probability of the product quality incidents occurring among the products under quality inspection;

determining whether the incident occurrence coefficient of the products under quality is not less than an incident occurrence threshold, when the incident occurrence coefficient is indeed not less than the incident occurrence threshold, it indicates that the products under quality inspection will have the product quality incidents, otherwise, it indicates that the products under quality inspection will not have the product quality incidents, and a number of product quality incidents of the products under quality inspection during a monitoring period is obtained through comparative analysis;

the incident occurrence coefficient is calculated and obtained according to the following formula:

$$SX_h = \begin{cases} 1, & WZ_h \geq W_0 XZ_h \geq X_0 \text{ or} \\ & (WZ_h \geq W_0 \text{ and } XZ_h \geq X_0) \\ \left(\dfrac{1}{\sqrt{e}-2}\right)^{\frac{(1+SR_h)*WZ_h - W_0}{W_0} + \frac{\sqrt[3]{(1+XR_h)*XZ_h - X_0}}{X_0}}, & WZ_h < W_0 \text{ and } XZ_h < X_0 \end{cases}$$

in the formula, e is a natural constant, h is a product number of the products under quality inspection during the monitoring period, wherein h=1, 2, ..., H, and H is a total number of the products under quality inspection during the monitoring period; $SX_h$ is an incident occurrence coefficient of an $h^{th}$ product under quality inspection during the monitoring period, $WZ_h$ is an appearance defect ratio of the $h^{th}$ product under quality inspection during the monitoring period, $XZ_h$ is a significant appearance defect ratio of the $h^{th}$ product under quality inspection during the monitoring period, $SR_h$ is a quantity growth rate of the $h^{th}$ product under quality inspection during the monitoring period, $XR_h$ is an area growth rate of the $h^{th}$ product under quality inspection during the monitoring period, $W_0$ is a threshold of the appearance defect ratio of the products under quality inspection, and $X_0$ is a threshold of the significant appearance defect ratio of the products under quality inspection.

2. The method for determining a number of product quality incidents based on a convolutional neural network according to claim 1, wherein a specific method for obtaining the preset optimized model is as follows:

analyzing the model training set with data annotation to obtain appearance defect size data, performing clustering analysis on the obtained appearance defect size data using a clustering method to obtain an anchor adjustment size, and replacing an initial anchor size in the preset model with the anchor adjustment size to obtain a first optimized model, wherein the appearance defect size data refers to pixel length and pixel width of the appearance defects with data annotation;

adjusting methods for filtering prediction boxes for the preset model and the first optimized model respectively using a suppression algorithm to obtain a second optimized model and a third optimized model, wherein the suppression algorithm comprise a non-maximum suppression algorithm and a soft non-maximum suppression algorithm; and the preset optimized model comprises the first optimized model, the second optimized model, and the third optimized model.

3. The method for determining a number of product quality incidents based on a convolutional neural network according to claim 1, wherein a specific method for obtaining the model performance coefficient is as follows:

obtaining a real-time model capability coefficient of the initial quality evaluation models by analyzing time consumed by model training and model test, wherein the real-time model capability coefficient is used to numerically describe real-time detection capability of the initial quality evaluation models;

obtaining a model accuracy coefficient of the initial quality evaluation models by analyzing detection accuracy corresponding to the model test results, wherein the model accuracy coefficient is used to numerically describe detection accuracy of the initial quality evaluation models, and the detection accuracy comprises detection accuracy of the products under quality inspection and detection accuracy of the corresponding product appearance defects;

analyzing and identifying a degree of influence of detection accuracy coefficient deviation and real-time detection capability coefficient deviation on the initial quality evaluation models by using a weighting method to obtain a coefficient influence weight, wherein the coefficient influence weight comprises accuracy weight and real-time capability weight, the detection accuracy coefficient deviation refers to a ratio of a difference between a detection accuracy coefficient of the initial quality evaluation models and a corresponding threshold to a difference between a first threshold of the detection accuracy coefficient and a threshold of the detection accuracy coefficient, and the real-time detection capability coefficient deviation refers to a ratio of a difference between a real-time detection coefficient of the initial quality evaluation models and a corresponding threshold to a difference between a first threshold of the real-time detection coefficient and a threshold of the real-time detection coefficient; and determining whether the obtained real-time model capability coefficient and model accuracy coefficient are greater than their corresponding thresholds, when the real-time model capability coefficient and model accuracy coefficient are not greater than the corresponding thresholds, it indicates that the model performance coefficient of the corresponding initial quality evaluation models is 0, otherwise, a model performance coefficient of the initial quality evaluation models is obtained renewedly by combining the coefficient influence weight derived from the weighting method.

4. The method for determining a number of product quality incidents based on a convolutional neural network according to claim 3, wherein a specific process for model filtering is as follows:

determining whether the model performance coefficient of the initial quality evaluation models is not less than the model performance coefficient threshold; and when the model performance coefficient is less than the model performance coefficient threshold, it indicates that the corresponding initial quality evaluation models do not meet the requirements, otherwise, the corresponding models are designated as candidate quality evaluation models, and a model complexity coefficient of the candidate quality evaluation models is obtained, wherein the model complexity coefficient is used to numerically describe model complexity of the initial quality evaluation models;

determining whether the model complexity coefficient of the candidate quality evaluation models is less than a model complexity coefficient threshold; and when the model complexity coefficient is not less than the model complexity coefficient threshold, it indicates that the corresponding candidate quality evaluation models do not meet the requirements, otherwise, a comprehensive model coefficient of the candidate quality evaluation models is obtained in combination with the corresponding model performance coefficient, wherein the comprehensive model coefficient is used to numerically describe comprehensive performance of the candidate quality evaluation models; and determining whether the comprehensive model coefficient of the candidate quality evaluation models is less than a corresponding threshold; and when the comprehensive model coefficient is less than the corresponding threshold, it indicates that the corresponding candidate quality evaluation models do not meet the requirements, otherwise, the candidate quality evaluation models are ranked and filtered according to the comprehensive model coefficient to obtain the quality evaluation model.

5. The method for determining a number of product quality incidents based on a convolutional neural network according to claim 4, wherein the comprehensive model coefficient is calculated and obtained according to the following formula:

$$ZX_n = \begin{cases} \tanh\left[P_n + \left(\frac{1}{2}\right)^{\frac{F_n-F^1}{F^0-F_n}}\right], & F^0 - F_n > 0 \\ 0, & F^0 - F_n \leq 0 \end{cases}$$

in the formula, n is a candidate quality evaluation model number, wherein n=1, 2, ..., N, and N is a total number of the candidate quality evaluation models; $ZX_n$ is a comprehensive model coefficient of an $n^{th}$ candidate quality evaluation model, $P_n$ is relative deviation of the model performance coefficient of the $n^{th}$ candidate quality evaluation model, $F_n$ is a model complexity coefficient of the $n^{th}$ candidate quality evaluation model, $F^0$ is a threshold of the model complexity coefficient, and $F^1$ is a first threshold of the model complexity coefficient.

6. The method for determining a number of product quality incidents based on a convolutional neural network according to claim 5, wherein a specific method for obtaining the model complexity coefficient is as follows:

obtaining a number of parameters of the candidate quality evaluation models, and obtaining relative deviation of the number of parameters of the candidate quality evaluation models in combination with a number of reference parameters of the quality evaluation model, wherein the relative deviation of the number of parameters refers to a ratio of a difference between the number of parameters and the number of reference parameters to the number of reference parameters;

obtaining floating-point operation data from model training time of the candidate quality evaluation models and a number of floating-point operations per second, and obtaining relative deviation of the floating-point operations of the candidate quality evaluation models in combination with the model training time and a floating-point operation threshold obtained from a threshold corresponding to the number of floating-point operations per second, wherein the relative deviation of the floating-point operations is a ratio of a difference between the floating-point operation data and a corresponding threshold to the corresponding threshold; and obtaining relative deviation of resource consumption in combination with resource consumption data of the candidate quality evaluation models and a corresponding threshold, and finally obtaining the model complexity coefficient of the candidate quality evaluation models.

* * * * *